United States Patent [19]

Baldus et al.

[11] 4,178,776

[45] Dec. 18, 1979

[54] INTERMITTENT VIBRATION IN FRACTIONAL CRYSTALLIZATION

[75] Inventors: Wolfgang Baldus, Pullach; Wilhelm Lehmer, Munich, both of Fed. Rep. of Germany

[73] Assignee: Linde Aktiengesellschaft, Wiesbaden, Fed. Rep. of Germany

[21] Appl. No.: 803,113

[22] Filed: Jun. 2, 1977

[30] Foreign Application Priority Data

Jun. 4, 1976 [DE] Fed. Rep. of Germany ....... 2625296
Jun. 4, 1976 [DE] Fed. Rep. of Germany ....... 2625276

[51] Int. Cl.² .............................................. B01D 9/04
[52] U.S. Cl. ......................................... 62/538; 62/123
[58] Field of Search .......................... 62/538, 532, 123

[56] References Cited

U.S. PATENT DOCUMENTS

| | | | |
|---|---|---|---|
| 3,266,263 | 8/1966 | Pollock | 62/533 |
| 3,279,200 | 10/1966 | Swiger | 62/532 |
| 3,411,309 | 11/1968 | Skrebowski et al. | 62/538 |

*Primary Examiner*—Norman Yudkoff
*Attorney, Agent, or Firm*—Karl F. Ross

[57] ABSTRACT

An inspissate of a solution having a solvent which can be crystallized out by cooling is passed into contact with an internally cooled surface through which a coolant is circulated. Relative vibration is established between the solution to be cooled and the surface with at least the vibration of the surface being interrupted periodically or aperiodically. The solution and the surface can be vibrated separately in alternating periods.

16 Claims, 1 Drawing Figure

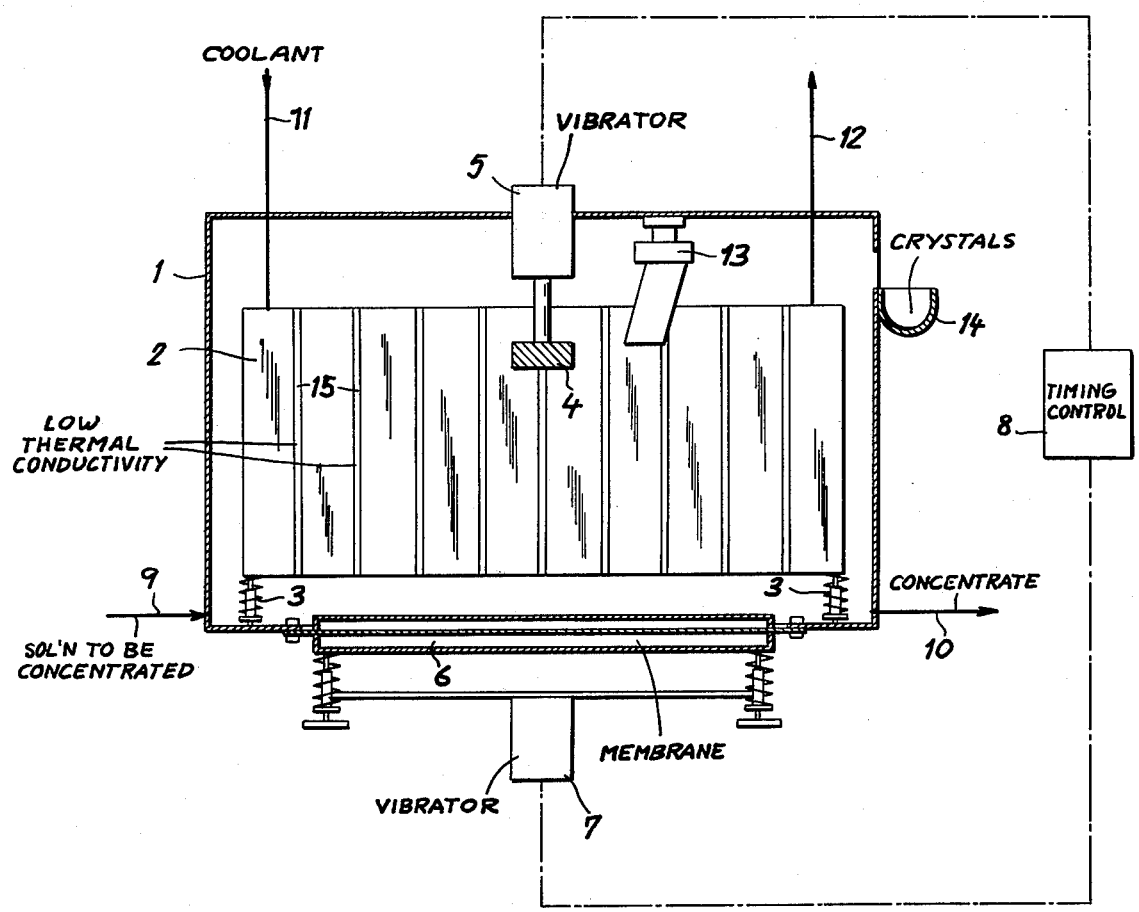

INTERMITTENT VIBRATION IN FRACTIONAL CRYSTALLIZATION

CROSS REFERENCE TO RELATED APPLICATION

The present application is related to the application Ser. No. 803,116 filed June 2, 1977 and commonly assigned with the present application, for a METHOD OF AND APPARATUS FOR THE CONCENTRATION OF A CRYSTALLIZABLE LIQUID.

FIELD OF THE INVENTION

The present invention relates to a method of and an apparatus for the thickening of solution containing crystallizable solvent and, more particularly, to an improved system for crystallizing a solvent component from the solution to form a concentrate or inspissate therefrom. Especially the invention relates to the freezing of ice crystals from aqueous solutions in order to form concentrate thereof.

BACKGROUND OF THE INVENTION

It has been proposed heretofore to form a concentrate or inspissate from a solution by freezing crystals of a solvent component therefrom by contacting the solution with a surface which is cooled, i.e. by passing a coolant, i.e. a refrigerant or a cold carrier such as brine, through the cooling surface which is in contact with the solution.

When this technique is applied to the concentrating of aqueous solutions, crystals of ice form upon the cooled surface and must be removed to prevent the ice layer from blocking further cold transfer to the solution. It is recognized in the art that ice constitutes a thermal insulator which becomes interposed between the solution and the cooled surface and can render the system inefficient.

It is known to remove the ice crystals from the surface or to prevent their deposition thereon by relative vibration of the surface and the solution, i.e. by vibrating the cooled surface to establish shear forces at the interface between the ice and/or liquid and the cooled surface. As a result, the ice does not coat the surface of the cooled body to any significant extent and the effect of the chilling or cooling can be maintained.

In the aforementioned copending application, there is described a method of and an apparatus for carrying out a thickening of a solution by an improved technique whereby the solution is introduced between surfaces which are cooled in the manner described and relative vibration is established, the solution passing between the surfaces in a direction transverse to the gravitational force so that the difference in density between the solution to be concentrated and the crystals which are formed by cooling causes the crystals to rise to the surface or to descend to the bottom of the vessel and hence provides for a continuous removal of the crystals from the solution.

The present invention is an extension of the principles described in that application.

It has been found in practice that, with still earlier systems for the aforedescribed purpose, uniform and continuous vibration of the cooling surface creates problems of various types. For example, the tendency of ice to freeze to the surface is not generally constant over the entire surface because different portions of the surface contact portions of the solution of different concentration. As a result, the temperature at which the solvent component can be frozen out of the solution tends to decrease as the concentration of the solution increases and hence parts of the cooled surface or some of the cooled surfaces must be maintained at lower temperatures than other parts, increasing the tendency of crystal deposits to form on these surfaces. A vibration that may be optimum for the removal of crystals from a solution of low concentration may not be optimum for the removal of crystals of the solvent in regions of high concentration.

The problem cannot be overcome by simply increasing the degree of vibration throughout the system since such excessive vibration also has been found to pose problems, especially in decreasing the efficiency of heat abstraction from the solution at the solid interface.

Thus it has been difficult, if not impossible, with earlier systems to effect a uniform freezing of crystals from a solution of the type described at an optimum rate.

Furthermore, when high oscillation frequencies of the heat-exchange surfaces are used, as has been deemed necessary heretofore when solutions of low concentrations are to be subjected to freeze out concentration, the conventional process creates the danger that, on the side of the heat-exchange surface in contact with the refrigerant or the cold carrier, cavitation phenomena may develop with a consequent reduction in heat abstraction efficiency and reduction in the freezing rate. Furthermore, high frequency oscillations may apply excessive stress to the vibrating components to cause problems with the apparatus.

Still another difficulty with prior art processes has been found to lie in the nonoptimum utilization of the energy operating the system and, more particularly, the energy supplied in the form of vibration to the system. At the beginning of the freezing process, as has been described, because of the low concentration of the solution, a high heat transfer rate is observed. Hence there is an increase in the tendency for the frozen-out or crystallized component to adhere to the heat exchange surface so that relatively high oscillation frequencies must be used to overcome this disadvantage. On the other hand, high oscillation or vibration frequencies may not be desirable elsewhere and hence the energy utilization or energy efficiency at other points in the apparatus may be less than desirable.

OBJECTS OF THE INVENTION

It is the principal object of the present invention to provide a method and an apparatus for the freezing of solvent components from a solution, i.e. for the concentration of a solution to form an inspissate, wherein the disadvantages of prior art systems can be avoided.

Another object of the invention is to extend the principles originally set forth in the copending application mentioned above.

It is also an object of the invention to provide a method which has uniform and optimum effect even in regions of different concentration, maximum efficiency of the freeze-out operation, a high rate of crystallization of the solvent component, and an optimum utilization of the energy which is applied.

SUMMARY OF THE INVENTION

These objects and other which will become apparent hereinafter are attained, in accordance with the present invention, in a method for crystallizing out solvent components of a solution to concentrate the solution and thereby form an inspissate therefrom wherein the cool surface in contact with the solution is vibrated for periods which alternate with rest periods or no vibration periods.

According to the invention, therefore, the solution is brought into contact with an internally cooled heat exchange surface which is in contact with the solution and at the solid/liquid interface abstracts heat from the solution to freeze out solvent components thereof and thereby concentrate the solution. The surface and the liquid are relatively vibrated according to the invention at least in part by vibrating the cooled surface for predetermined periods of vibration separated by no-vibration or rest periods.

The interrupted vibration of the heat exchange surface has been found to insure a more effective and uniform flow of the refrigerant or cold carrier through the plates or other bodies defining the cooling surface so that the rate of heat abstraction by this liquid coolant is uniformly high, at least during the rest periods, so that no cavitation results. Most surprisingly, it has been found that the rest periods do not permit any marked decrease in the heat transfer efficiency by coating of the surface during this interval with ice or thermally-insulating crystals, any ice which does tend to deposit being readily shed by the surface when the latter is set into vibration during the next vibration period.

Furthermore, the interruption of the vibration for rest periods as described appears to increase the overall vibration effect in the removal of ice or the prevention of the deposition of the crystals upon the surface. In other words, as compared with constant vibration of the surface with a given temperature, vibration amplitude and frequency, interruption of the vibration for rest periods of a duration in excess of the period of vibration (reciprocal of the vibration frequency) and the subsequent vibration of the surface for an interval which is also a multiple of the period of vibration, provides significantly improved ice-removal results.

According to a particularly advantageous feature of the invention, the surface and the solution to be concentrated are alternately set into vibration, i.e. each is vibrated for a vibration interval and has a rest period between the vibration intervals, the vibration interval of the solution coinciding at least in part with the rest period of the surface and the rest period of the surface coinciding at least in part with the vibration interval of the solution. This has been found to ensure the removal of the crystal components which might otherwise tend to deposit upon the surface during the rest periods of the latter because of the mass movement of the solution during the vibration interval thereof. This system thus has the two-fold advantage that it enables the rest period of the surface to provide more effective heat transfer during this interval but yet ensures the removal of any ice crystals which might tend to form during standstill of the vibration surface by the vibration of the solution in contact therewith. The crystal removal during the vibration interval of the solution is effected by flow forces of the solution in contact with the surface.

Another advantage of this dual vibration of the surface and the solution resides in the displacement of crystal components which are prevented from depositing upon the surface or are removed therefrom by the flow forces of the liquid. Moreover, the solution is thoroughly mixed by such vibration thereof so that concentration gradients in the solution are eliminated or reduced and the freezing process takes place more uniformly over the interfaces or interface between the solution and the cooled body.

When vibration of the surface is subsequently effected, moreover, the instant at which the vibration commences provides an especially large shear force at the interface between the static inertia of the crystals and the contacting liquid and the vibrated surface so that a complete removal of the crystal component is ensured and continuous freeze out of the crystals can be guaranteed. This instantaneous shock-like effect appears to be far greater than the shear effects from vibration subsequent to the initial movement of the surface.

It has been found to be advantageous, moreover, to vary the oscillation frequency of the heat exchanger's surface, i.e. to change the frequency of vibration from a high frequency to a low frequency or conversely, from a low frequency to a high frequency during the vibration interval of the heat exchanger surface. This variation in the vibration frequency during the course of the vibration interval has been found to allow optimum control of the freeze-out effect to solutions of different types and different concentrations, thereby improving the economy of the system.

Variation of the oscillation frequency of the cooled surface is also effected, according to the invention, from vibration interval to vibration interval during the freeze-out process. For example, during initial vibration periods of the surface in the overall process, a relatively high frequency can be used and this frequency can be reduced step by step from vibration interval to vibration interval until a relatively low frequency is used. Conversely, it may be desirable to use a low frequency at the inception of the process and progressively increase this frequency.

The phenomenon appears to be a function of concentration. While we do not wish to be bound by any theory in this regard, we believe that, at the beginning of the freezing process, the concentration of the solution and therefore the melting point thereof are relatively low in comparison to these parameters at the end of the freezing process and hence the tendency toward adhesion of the crystallized components from the solution to the heat exchange surface is relatively great. At the start of the process, therefore, high vibration frequencies can be applied to the heat exchange surface and, as the concentration increases and the melting point changes, this vibration frequency can be reduced. Since a reduced vibration frequency increases the rate of heat transfer while the tendency of the crystallized components to adhere to the surface is reduced an optimum freeze out of the crystal component can be ensured in spite of the fact that the heat exchange rate for a given frequency will be lower within increasing concentration. Thus the overall heat-abstraction process can be controlled to eliminate cavitation phenomena between the coolant and the surface on the one hand, to compensate for reduction of the heat transfer rate, and for optimum energy utilization.

The principles of the invention can be applied to a process for the continuous freezing of crystal solids from the solvent of a solution using the principles established for example, in the aforementioned copending application. In any event, the solution is passed continuously through the heat exchanger and along the cooled surface from an inlet to an outlet, the crystallized components being continuously removed from the solution. The solution can progressively increase in concentration along a particular heat exchange surface and the variation of the vibration frequency of this surface has the advantage that the maximum shear effect for crystals depositing at various locations will eventually be achieved during each time span of frequency variation because the crystals at various locations may require different vibration frequency for their optimum removal from the surface.

It has also been found to be advantageous to vary the frequency of the vibrating solution in a similar manner, thereby ensuring optimum freeze-out conditions.

It has been found to be advantageous, moreover, to vibrate the cooled surface and the solution each with a different vibrating frequency, this having been found to give a particularly effective mixing of the solution and a most effective removal of the ice crystals from the cooled surface. It appears that this increase in the efficiency of crystal removal is due to the increase in the forces applied at the interface because of the combination of inertia and flow forces on these crystals.

According to still another feature of the invention, the amplitude of the oscillations of the heat exchange surface and/or the solution to be concentrated is varied corresponding to the vibrating frequency. For example, to avoid cavitation upon a reduction in the vibrating frequency, the amplitude of vibration of the heat exchanger surface is correspondingly reduced. When high frequencies are desirable to ensure maximum shear forces for the separation of the ice components, i.e. crystal component, the vibration amplitude is correspondingly increased. This, of course, provides maximum shear forces.

It has been found that best results are obtained when the solution is vibrated, oscillated, with a frequency which is higher than the vibrating frequency of the heat exchange surface. The higher frequency of the solution ensures that the flow forces contributing during the vibration interval of the solution to the removal of the ice crystals from the cooled surface will not be significantly weaker than the inertial forces produced by vibration of the surface directly.

Highly effective freezing conditions obtain when the heat exchange surface is vibrated with a frequency of 10 to 50 Hz, preferably with a frequency greater than 30 Hz. The duration for which the low frequency is maintained constant can be determined by the period of time required for a bridging of the crystal component between a pair of spaced apart juxtoposed heat exchange surfaces between which the solution is conducted. By way of example, however, it should be noted that the solution may be vibrated at a frequency of, say, 20 to 120 Hz and preferably at a frequency about 50 Hz when the heat exchange surface is vibrated at 30 Hz or thereabove. The vibration can be effected for a period of the order of 10 seconds to, say, 10 minutes with the rest period having a duration in the same range. In general the rest period should be between one fifth of the vibration interval and twice the vibration interval.

According to the apparatus aspects of the invention, a housing, preferably in the form of a tank, is provided to receive the solution to be concentrated, the tank receiving, in turn, a heat exchange surface which is cooled by passing a refrigerant or a cold carrying liquid therethrough, e.g. brine. The heat exchange surface, generally one of a plurality of such surfaces between which the solution is passed, is connected to a vibrating device while, on the floor of the tank, a second vibrating device is provided in conjunction with a membrane to generate oscillation in the solution to be concentrated. The frequencies and amplitudes of both of these vibrators can be controlled and the timing of the vibrating interval and rest period can similarly be controlled by a regulator connected to both vibrators. Any conventional timing and amplitude or frequency control system can be provided for this purpose.

According to a feature of the invention, the heat exchange surface is provided with strip-like zones of reduced heat transfer rate, e.g. by coating the surface with strips of material of low heat conductivity, e.g. polyethylene, the strips running preferably in a vertical direction and transverse to the direction of flow of the solution. The plates may be upright and may be vibrated in the vertical direction.

These strips define between them zones of high heat-abstraction rate or thermal conductivity and constitute, in turn, zones of low thermal conductivity. It has been found that the presence of these strips prevents the development of continuous crystal or ice films on the surface even where the vibration is not fully effective for some reason. Of course, when the strips are used, the vibration rates and amplitudes can be further reduced with energy saving. In other words, far from reducing the efficiency of the apparatus by blocking heat exchange in the low thermal conductivity zones, the presence of such zones increases the efficiency of the apparatus.

BRIEF DESCRIPTION OF THE DRAWING

The above and other objects, features and advantages of the present invention will become more readily apparent from the following description, reference being made to the accompanying drawing the sole FIGURE of which is a diagrammatic vertical elevational view of an apparatus for carrying out the process of the present invention.

SPECIFIC DESCRIPTION

While reference has been made to the drawing herein for an explanation of the principles of the present invention, it should be noted that the tank can have the configuration shown in the aforementioned copending application and the plates can be similarly constructed to define a horizontal flow path for the liquid which permits the ice crystals to rise to the surface or other crystals to descend to the bottom and hence separate continuously from the liquid. Furthermore, to the extent that any elements of the apparatus and the method are not fully described herein, reference may be had to the aforementioned copending application for a fuller explication thereof.

In the freezing apparatus illustrated in the drawing, the tank-shaped housing 1 has an elongated rectangular plan configuration and is provided in the longitudinal direction with a plurality of heat exchanger plates 2 which may be formed as evaporator plates into which a refrigerant is introduced into a liquid state and permitted to evaporate therein. The transversely spaced evaporator plates 2 are provided parallel to one another with the same transverse spacing and can be alternately connected to the ends of the tank as described in the aforementioned copending application.

A plurality of vibratile elements, e.g. support springs 3, can be provided between the bottom of the housing 1 and each plate. The plates may be connected together by a transverse bar 4 which, in turn, is connected to a vibrator 5 which vibrates the evaporator plates 2.

The bottom of the housing 1 is closed by a membrane 6 which is connected to a second vibrating device 7. A control unit 8 as described above and in the aforementioned copending application, is connected to the vibrators 5 and 7 so as to operate them alternately with variable frequency and variable amplitude in the manner previously described.

The solution to be concentrated is introduced through an inlet diagrammatically represented at 9 in one end wall of the tank 2 close to the bottom thereof and the resulting concentrate or inspissate is recovered at an outlet 10 in the opposite end wall at the bottom of the tank. The refrigerant is introduced via a manifold 11 to all of the plates 2 at the side of the tank provided with the inlet 9, the vaporized refrigerant being recovered by a manifold 12 at the end of the tank provided with the outlet 10. This arrangement simplifies the separation of the frozen component from the liquid component of the solution.

The crystallized component separated from the solution by its lower density rises to the surface of the solution and passes over the edge of the tank into a discharge trough 14. The crystals can be displaced toward the trough by a sweeper 13 displaceable along the cover of the tank or, by endless-chain means as described in the aforementioned copending application. The sweeper 13 can be formed as a comb whose members reach between the plates 2 and dip into the solution.

To further prevent the formation of a continuous layer of the frozen crystal component upon the evaporator plates 2, the latter are provided with vertical strip-like zones 15 of reduced thermal conductivity, the zones extending transversely to the flow of the liquid phase but in the direction of movement of the crystal component. These zones, each of which can have a width which is a small fraction of the width of the zones of high heat transfer, i.e. a width of one-fiftieth to one-sixth of the width of the heat transfer zone, can be formed by applying strips of thermally insulating material to the metal plates 2. A suitable material of low thermal conductivity for this purpose is polyethylene.

While the embodiment illustrated in the drawing is the preferred configuration, it will be apparent that the principles described also apply to a tube bundle heat exchanger for the concentration of solutions by the process of the present invention.

We claim:

1. A method of concentrating a solution by the freezing of crystals of a solvent from the solution, said method comprising the steps of:
   contacting said solution with at least one heat-exchange surface;
   cooling said surface with a fluid coolant to a temperature below the freezing point of said solvent to freeze crystals of said solvent from said solution;
   imparting relative vibratory movement to said surface and said solution; and
   intermittently interrupting the relative vibratory movement of said surface and said solution to establish rest periods between intervals of such vibration, said relative vibratory motion being imparted to said solution and said surface by vibrating said surface and vibrating said solution independently and alternately.

2. The method defined in claim 1 wherein the frequency of the vibration is substantially 10 to 50 Hz.

3. The method defined in claim 1 wherein said surface and said solution are vibrated each at a frequency different from the vibration frequency of the other.

4. The method defined in claim 1 wherein the vibration frequency of said solution is higher than the vibration frequency of said surface.

5. A method of concentrating a solution by the freezing of crystals of a solvent from the solution, said method comprising the steps of:
   contacting said solution with at least one heat-exchange surface;
   cooling said surface with a fluid coolant to a temperature below the freezing point of said solvent to freeze crystals of said solvent from said solution;
   imparting relative vibratory movement to said surface and said solution; and
   intermittently interrupting the relative vibratory movement of said surface and said solution to establish rest periods between intervals of such vibration, said surface being vibrated; and
   varying the vibration frequency of said surface during the process of crystallizing said solvent from said solution.

6. The method defined in claim 5 wherein the frequency of vibration is about 10 to 50 Hz.

7. The method defined in claim 5, further comprising the step of varying the amplitude of vibration of said surface to correspond to the variation of the vibration frequency thereof.

8. A method of concentrating a solution by the freezing of crystals of a solvent from the solution, said method comprising the steps of:
   contacting said solution with at least one heat-exchange surface;
   cooling said surface with a fluid coolant to a temperature below the freezing point of said solvent to freeze crystals of said solvent from said solution;
   imparting relative vibratory movement to said surface and said solution;
   intermittently interrupting the relative vibratory movement of said surface and said solution to establish rest periods between intervals of such vibration, said solution being vibrated; and
   varying the vibration frequency of said solution during the crystallization of said solvent from said solution.

9. The method defined in claim 8 wherein the frequency of vibration is substantially 10 to 50 Hz.

10. The method defined in claim 8, further comprising the step of varying the amplitude of vibration of said solution corresponding to variation in the vibration frequency thereof.

11. A method of concentrating a solution by the freezing of crystals of a solvent from the solution, said method comprising the steps of:
    contacting said solution with at least one heat exchange surface;
    cooling said surface with a fluid coolant to a temperature below the freezing point of said solvent to freeze crystals of said solvent from said solution;
    imparting relative vibratory movement to said surface and said solution; and
    varying the frequency of said relative vibratory movement during the course of crystallization of solvent from said solution.

12. The method defined in claim 11, further comprising the step of varying the amplitude of said relative vibratory movement corresponding to the variation in the frequency thereof.

13. An apparatus for concentrating a solution containing a crystallizable solvent, comprising:
   a vessel adapted to receive said solution, at least one heat exchange surface in said vessel being in contact with said solution;
   means for fluid cooling of said surface to a temperature below the melting point of said solvent;
   first vibrator means connected with said surface for vibrating same;
   second vibrator means in contact with said solution in said vessel for vibrating same; and
   control means connected to said first and second vibrator means for operating the same alternately and for predetermined periods to establish rest periods between vibration intervals of said vibrator means.

14. The apparatus defined in claim 13 wherein said surface is formed with strips of low thermal conductivity in spaced-apart relation.

15. The apparatus defined in claim 13 wherein said second vibrator means includes a membrane forming at least a portion of the bottom of said vessel.

16. The apparatus defined in claim 15, further comprising means for varying the vibration frequency of each of said vibrator means.

* * * * *